United States Patent [19]

Nishimura

[11] Patent Number: 5,821,977
[45] Date of Patent: Oct. 13, 1998

[54] IMAGE FORMING APPARATUS AND CONTROL METHOD FOR REDUCING THE REQUIRED PROCESSING TIME

[75] Inventor: Hiroyuki Nishimura, Tokyo, Japan

[73] Assignee: Kabushiki Kaisha Toshiba, Kawasaki, Japan

[21] Appl. No.: 710,012

[22] Filed: Sep. 11, 1996

[30] Foreign Application Priority Data

Sep. 20, 1995 [JP] Japan ..................................... 7-241392

[51] Int. Cl.[6] ...................................................... H04N 1/04
[52] U.S. Cl. ............................ 347/234; 347/248; 399/52; 399/212
[58] Field of Search .................................... 358/300, 302, 358/401; 399/52, 211, 212, 213; 347/234

[56] References Cited

U.S. PATENT DOCUMENTS 5,107,279  4/1992  Yamamoto et al. .................... 346/108
5,241,330  8/1993  Kawabata et al. ...................... 347/258

*Primary Examiner*—Benjamin R. Fulller
*Assistant Examiner*—Hai Pham
*Attorney, Agent, or Firm*—Foley & Lardner

[57] ABSTRACT

The invention provides an image forming apparatus which requires only a little standby time at the time of shifting from a standby state to a usual operation state, and accordingly can reduce the required processing time. In a copy machine 2 employed in the invention, a scanner CPU 121 generates a timing signal with a number of clocks substantially equal to the number of clocks of a horizontal synchronization signal, thereby performing shading correction of the output of a CCD line sensor 24 using a shading correction circuit 126. The scanner CPU 121 counts clocks CKS, each of which is obtained by dividing, using the divider 168, the frequency of a reference clock CK by a predetermined value, and outputs a pulse signal as the timing signal substantially in synchronism with the output of a horizontal synchronization signal when the number of counted clocks CKS reaches a predetermined value.

11 Claims, 7 Drawing Sheets

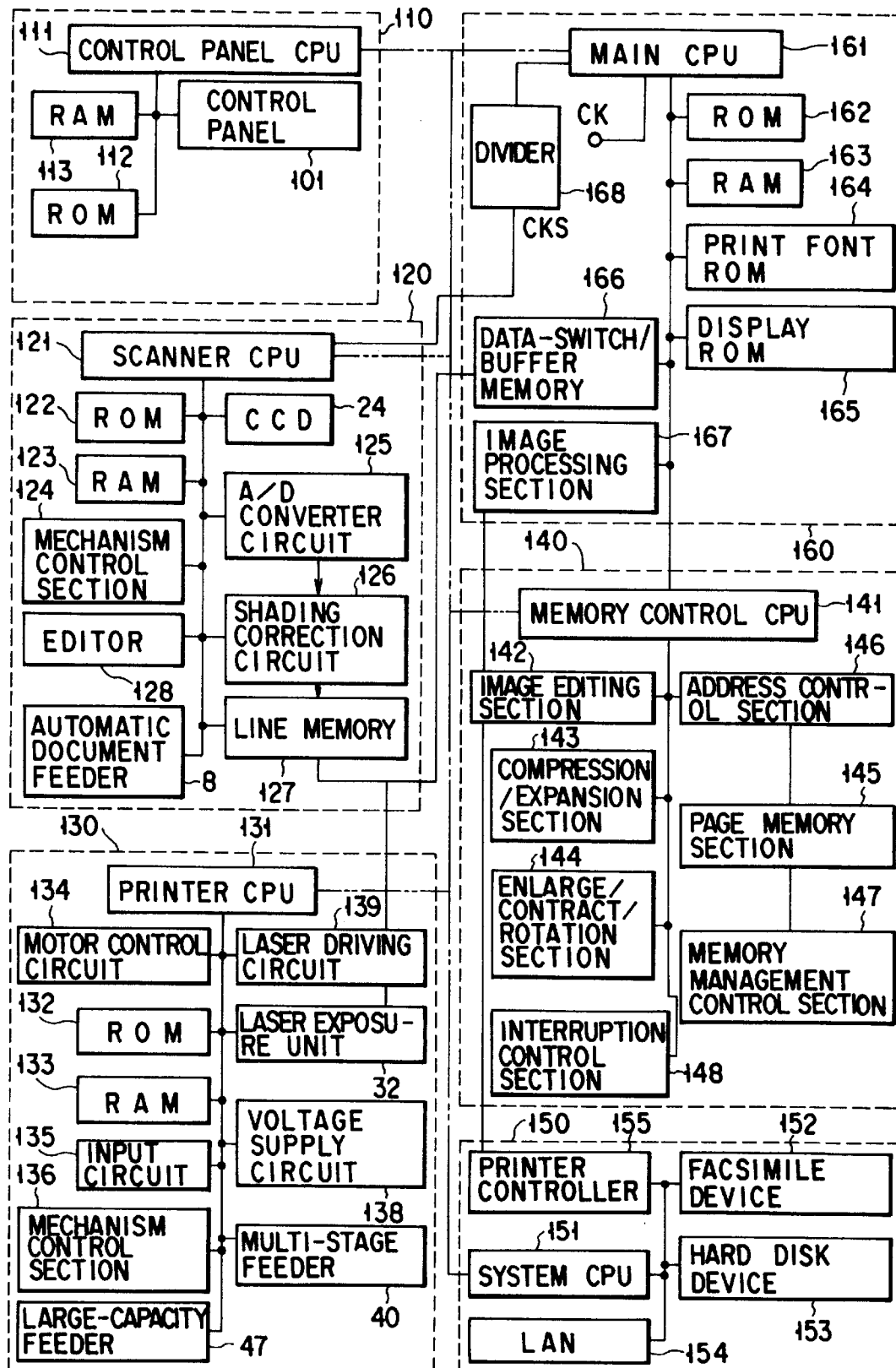
F I G. 1

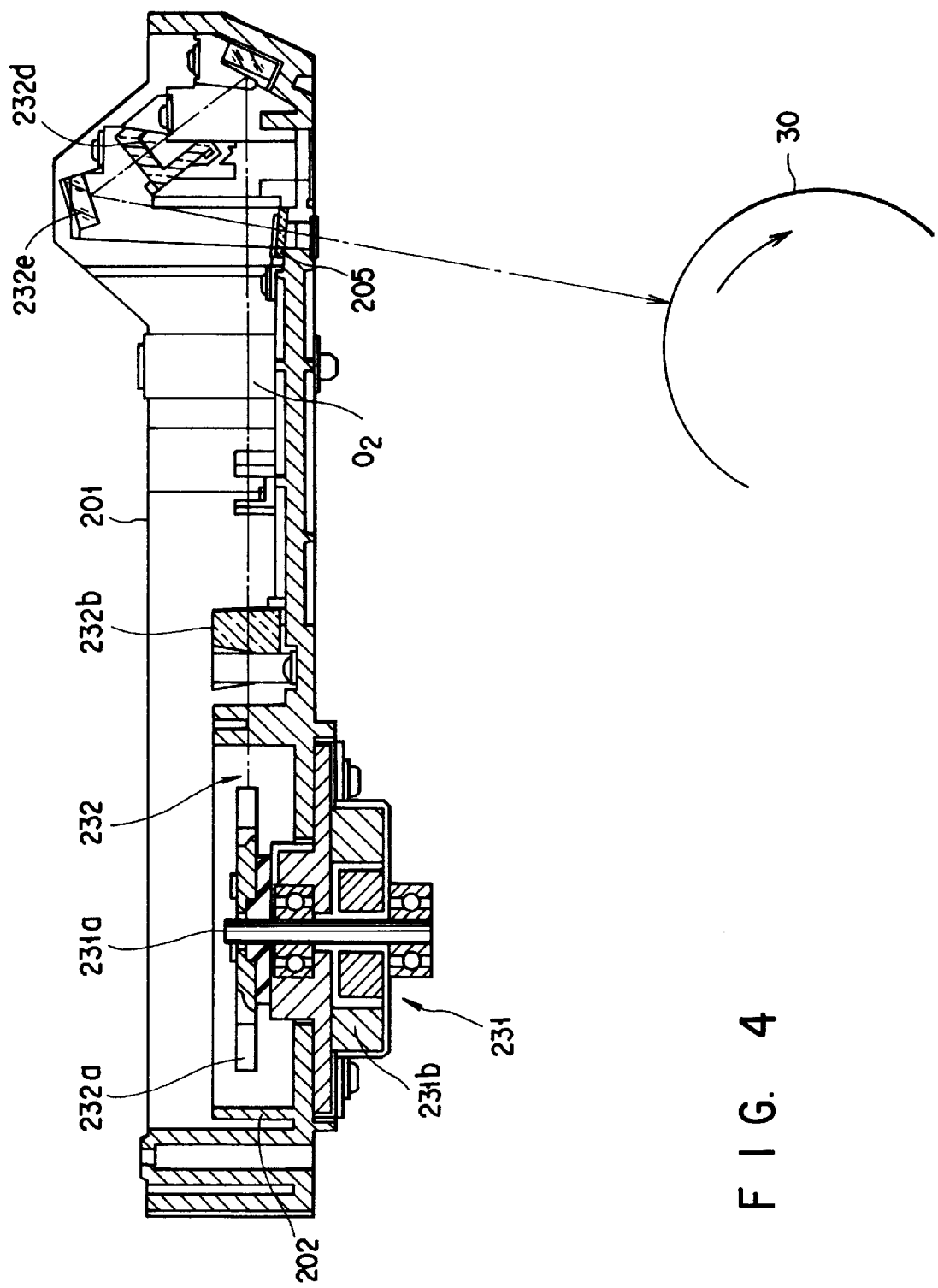
F I G. 4

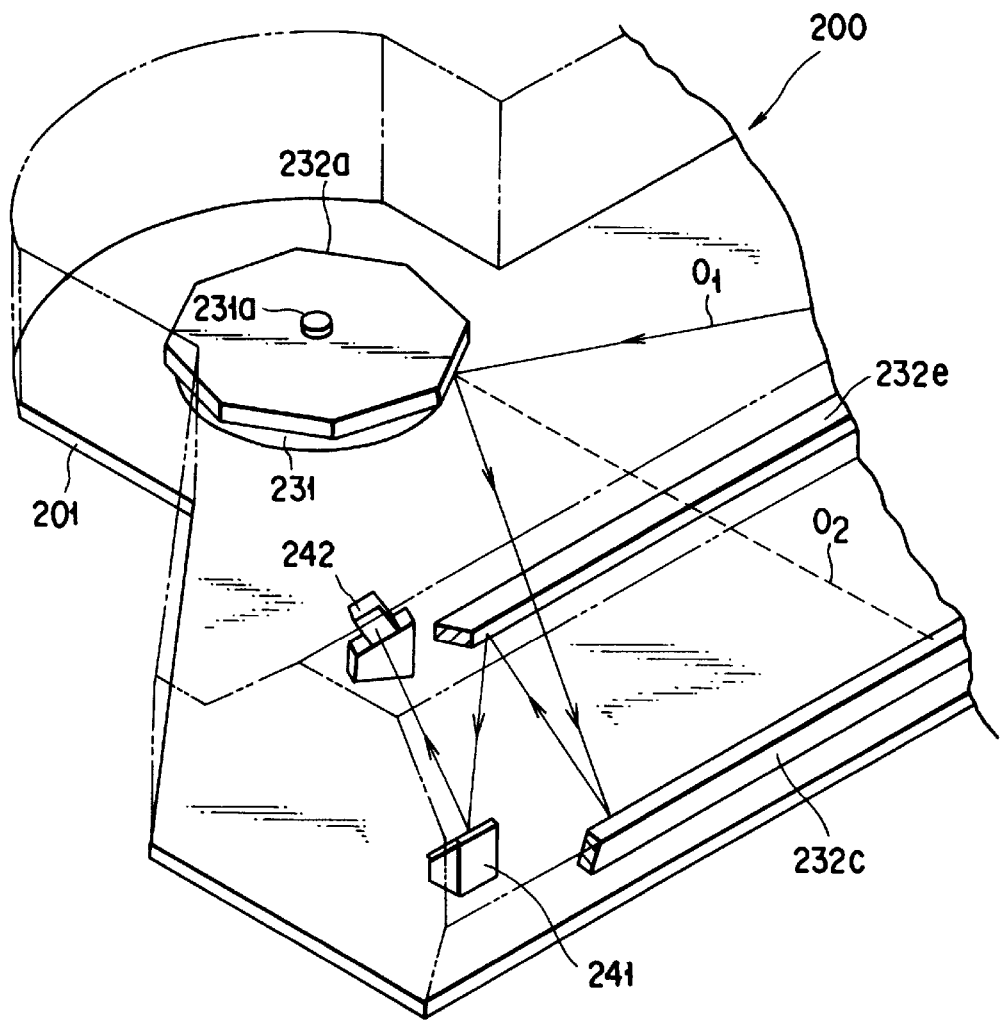
F I G. 5
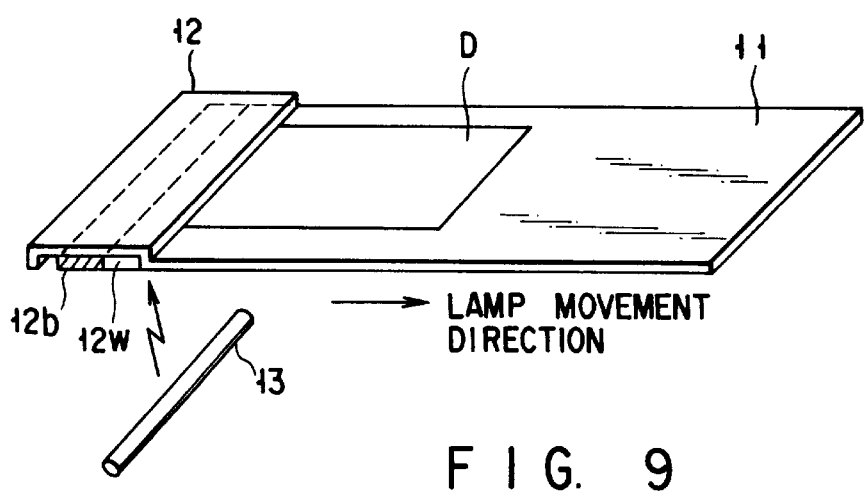
F I G. 9

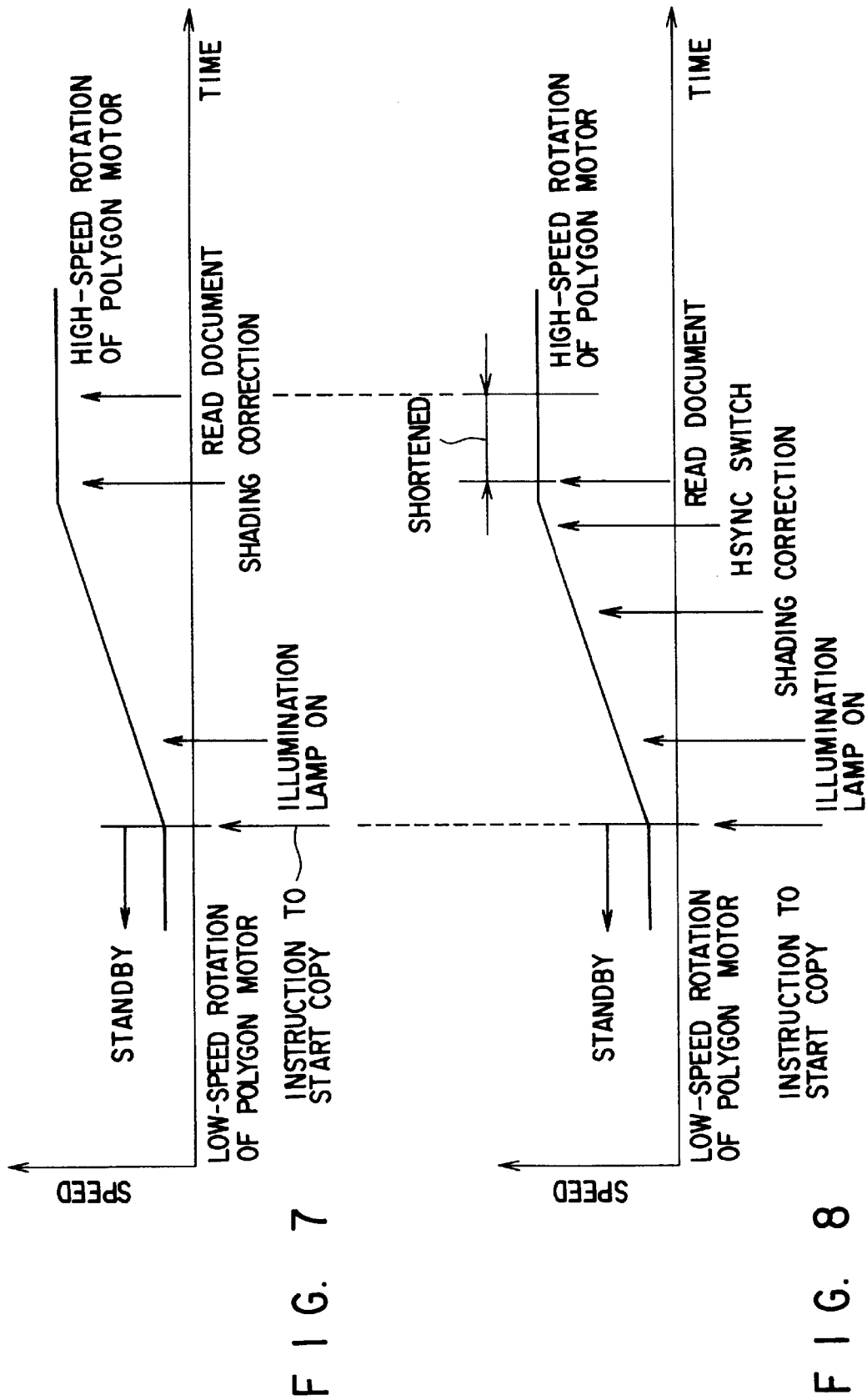

IMAGE FORMING APPARATUS AND CONTROL METHOD FOR REDUCING THE REQUIRED PROCESSING TIME

BACKGROUND OF THE INVENTION

1. Field of the Invention

This invention relates to an image forming apparatus for forming an image on a photosensitive body by an electrostatic photographing process, developing the image using toner, and outputting the image on a sheet of paper.

2. Description of the Related Art

In an image forming apparatus using an electrostatic photographing process, an image is formed using a photosensitive drum with photoconductivity which serves as an image carrier, and a developer which includes toner. Specifically, the image is formed by applying light corresponding to the image to the photoconductive drum charged with a predetermined potential, to thereby obtain an electrostatic latent image, and then developing the latent image with toner.

A charging device, a developing device, a transfer device, and a cleaning device are arranged around the photosensitive drum in this order in the direction of rotation thereof.

Between the developing device and the charging device, there are provided an exposure device for exposing the surface of the photoconductive drum to provide thereon image data (i.e. a latent image), a fuser device for fixing an image developed with toner on a sheet of paper, etc.

Image data is provided to the exposure device after it is converted to an electric signal by a reading device, which is formed integral with an upper portion of the exposure device or separated therefrom and is connected thereto by means of an interface.

The photosensitive drum is a drum-shaped photo-semiconductor, which made of a cylindrical conductor of aluminum, etc. and a photoconductive layer of selenium or OPC (Organic Photo-Conductor) having a predetermined thickness. When the photoconductive drum is entirely charged with a predetermined potential and partially radiated with light, only that portion of the drum which is radiated with light serves as a conductor portion and holds thereon a latent image corresponding to image data.

The reading device has a document table for holding thereon an object to be read, i.e. a document, an illumination lamp for illuminating the to-be-read object set on the document table, and a CCD sensor for converting light reflected from the to-be-read object to an electric signal. The reading device outputs an electric signal indicative of image data put on the document. Many reading devices use a line CCD sensor which can read image data only in a predetermined direction. In this case, image data on a document is read as an electric signal at regular intervals in the predetermined direction (which will hereinafter be referred to as a "main scanning direction"). The overall image data on the document can be read by moving the document in a direction (which will hereinafter be referred to as a "sub scanning direction") perpendicular to the main scanning direction.

The charging device has a charging wire for performing corona discharge. When a voltage of 4–8 kV is applied to the charging wire from a power supply connected thereto, the photosensitive drum has a surface potential, for example, of −700 V.

The exposure device is a laser beam exposure device, which emits light for varying the surface potential of that portion of the photosensitive drum which corresponds to image data stored in an image memory or obtained by converting an image of a document. The exposure device is located between the developing device and the charging device and forms an electrostatic latent image on the photosensitive drum.

The developing device is opposed to that surface portion of the photosensitive drum which is to be developed. This device has a developing roller for supplying the electrostatic latent image on the photosensitive drum with a developer consisting of toner and a carrier, which carrier frictionizes toner to be charged with a predetermined polarity and serves as a magnetic brush, thereby attaching only toner to the electrostatic latent image to form a toner image.

The developing roller is formed of a rotatable nonmagnetic cylindrical outer peripheral member and a magnet fixed at a predetermined location. This roller is adapted to transfer the developer to the to-be-developed portion of the drum, and to magnetically attract the carrier so as to supply only toner to the latent image.

The transfer device is formed of a corona discharge device or a metal roller, which is similar to the charging device, and is adapted to electrostatically transfer the toner image on the photosensitive drum to a sheet of paper fed in accordance with the rotation thereof.

The fuser device consists of a pair of rollers each having a heater incorporated therein, and is adapted to fuse toner electrostatically attached to the sheet by applying a predetermined voltage to the rollers, so as to fix toner on the sheet.

The cleaning device has a deelectrifier lamp for emitting light to the overall surface of the photosensitive drum, and a cleaner for scraping away toner remaining on the drum. This device is adapted to remove electricity remaining on the drum and stabilize the surface of the drum for the next image forming operation.

At the time of reading an image of a document by means of the reading device, image reading is started on the basis of a horizontal synchronization signal supplied from the image forming apparatus including the photosensitive drum, in order to synchronize the exposure start position of a laser beam emitted from the laser beam exposure device to the drum (i.e. the write start position on the drum), with the read start position on the document.

The horizontal synchronization signal is output from the laser beam exposure device with reference to the laser beam emitted therefrom to the photosensitive drum. Accordingly, the horizontal synchronization signal depends upon the rotational speed of a polygonal mirror incorporated in the laser beam exposure device. In other words, the start of reading of an image of a document by the reading device depends upon whether the rotational speed of the polygonal mirror is stable or unstable, i.e. whether or not the speed reaches a predetermined value. This means that a certain period of time is necessary before the start of reading.

At the time of standby and not at the time of image forming, the rotary mechanism, the heater lamps, etc. incorporated in the image forming apparatus are generally operated with power lower than that used during image forming, in order to save power or reduce noise. For example, a motor, etc. which constitutes the rotary mechanism is operated, at the time of standby, at about ½ the rated rotational speed.

Therefore, even if an instruction to start copy is supplied, an image of a document cannot be read by the reading device until the polygonal mirror of the laser beam exposure device is shifted from the standby rotational speed to the predetermined rated rotational speed.

As a result, the time required from the supply of an instruction to start reading to the completion of a copy of a first document inevitably increases. Such increase in required copy time is especially conspicuous at the time of instructing a copy operation when the apparatus is in the standby state. At this time, the required copy time is as much as twice the time required during continuous copy operation.

SUMMARY OF THE INVENTION

It is the object of the invention to provide an image forming apparatus which does not require a great amount of time when it is shifted from its standby state to its normal operation state, thereby reducing the time required for copy.

According to a first aspect of the invention, there is provided an image forming apparatus for forming an image on an image forming medium comprising:

means for scanning a target area at a predetermined point of time to generate image data;

means for emitting light of an intensity corresponding to image data generated by the scanning means;

means for reflecting the light emitted from the emitting means, toward an image carrier, the reflecting means having a plurality of reflecting sections;

means for rotating a reflection section of the reflecting means so that the light from the emitting means exposes the image carrier;

means for forming an image corresponding to an exposure image formed on the image carrier by exposure by the reflection section of the rotating means;

means for outputting a synchronization signal to determine a point of time of emission by the emitting means at the time of the exposure, which is performed by the reflection section of the reflecting means rotated by the rotating means;

means for generating a timing signal substantially identical to the synchronization signal used for the exposure by the reflection section of the reflecting means;

means for driving the rotating means to rotate the reflection section of the reflecting means at a first speed at the time of the exposure by the reflecting means, and to rotate the reflection section of the reflecting means at a second speed lower than the first speed at the time of an operation other than the exposure; and means, responsive to an instruction to start the read operation of the scanning means, for controlling so that the scanning means scans the target area in synchronism with the timing signal from the generating means until the rotational speed of the reflection section shifts from the second speed to the first speed, and for controlling so that the scanning means scans the target area in synchronism with the synchronization signal from the outputting means after the driving means has shifted the rotational speed of the reflection section to the first speed.

According to a second aspect of the invention, there is provided an image forming apparatus for forming an image on an image forming medium comprising:

means for illuminating an object to be read;

means for converting light reflected from the object illuminated by the illuminating means, to an electric signal in units of a dot with a predetermined size;

means for radiating a laser beam on the basis of image data indicative of the to-be-read object photoelectrically converted by the converting means;

means including a rotatable reflection section for reflecting the laser beam radiated from the radiating means and having its intensity varied on the basis the image data indicative of the to-be-read object;

means for detecting part of the laser beam reflected from the reflection section of the reflecting means;

means for generating a horizontal synchronization signal when the detecting means detects the laser beam reflected by the reflection section of the reflecting means;

means for determining a point of time at which the converting means subjects the light reflected from the to-be-read object, to photoelectric conversion; and control means for causing the converting means to subject the light reflected from the to-be-read object, to photoelectric conversion at the time point determined by the determinating means, until the rotational speed of the reflection section of the reflecting means reaches a predetermined value and the generating means generates the horizontal synchronization signal.

According to a third aspect of the invention, there is provided a method of forming an image of a document, which is employed in an image forming apparatus including: illumination means for illuminating an object to be read; photoelectric conversion means for converting light reflected from the object illuminated by the illumination means, to an electric signal in units of a dot with a predetermined size; laser beam radiation means for radiating a laser beam on the basis of image data indicative of the to-be-read object photoelectrically converted by the photoelectric conversion means; reflection means including a rotatable reflection section for reflecting, by rotating the reflection section at a predetermined speed, the laser beam radiated from the radiation means and having its intensity varied on the basis the image data indicative of the to-be-read object; photodetector means for detecting, in a predetermined position, the laser beam reflected from the reflection section of the reflection means; horizontal synchronization signal generation means for generating a horizontal synchronization signal when the photodetector means detects the laser beam reflected by the reflection section of the reflection means; and timing determination means for determining a point of time at which the photoelectric means subjects the light reflected from the to-be-read object, to photoelectric conversion;

the method comprising the step of subjecting the light reflected from the to-be-read object, to photoelectric conversion on the basis of a timing signal output from the timing determination means, until the rotational speed of the reflection section of the reflection means reaches a predetermined value and the horizontal synchronization signal generation means generates the horizontal synchronization signal.

Additional objects and advantages of the invention will be set forth in the description which follows, and in part will be clear from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic block diagram, showing an image forming apparatus to which the invention is applied;

FIG. 4 is a schematic sectional view, taken along lines IV—IV of FIG. 3;

FIG. 5 is a partially enlarged view, showing a horizontal synchronization detecting mechanism 5 incorporated in the laser exposure device of FIGS. 3 and 4;

FIG. 7 is a timing chart, useful in explaining the operation of a conventional case corresponding to the operation shown in FIG. 6;

FIG. 8 is a timing chart, useful in explaining the advantage resulting from the operation of FIG. 6; and FIG. 9 is a schematic view, useful in explaining shading correction performed in the image forming apparatus shown in FIGS. 1 and 2.

DETAILED DESCRIPTION OF THE PREFERRED EMBODIMENTS

The embodiment of the invention will be explained with reference to the accompanying drawings.

Figure 2:
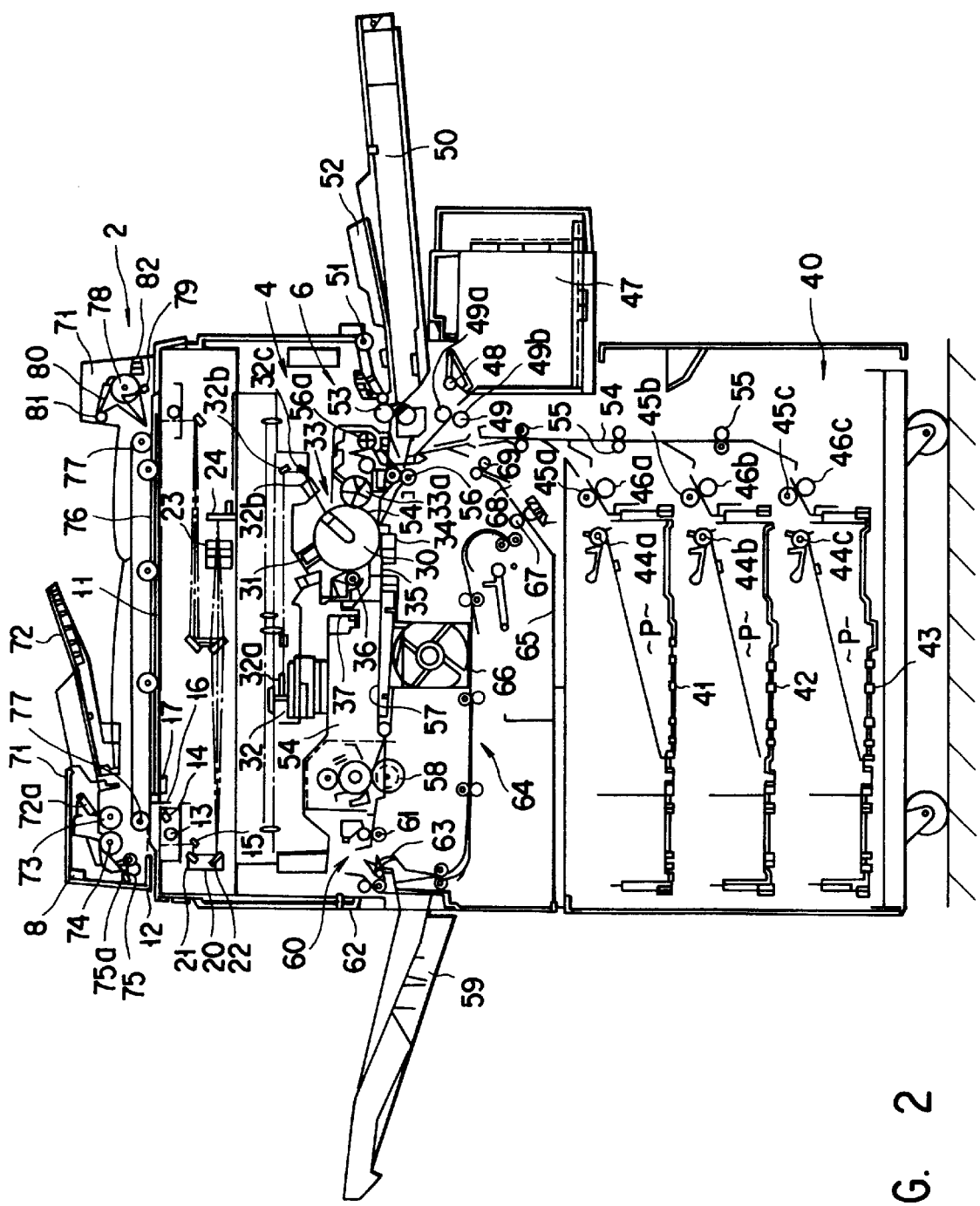
FIG. 2 is a schematic view, showing an example of the image forming apparatus shown in FIG. 1.

As is shown in FIG. 2, an image forming apparatus or electronic photograph type digital copy machine 2 has an image reading section 4 functioning as reading means, and an image forming section 6 functioning as image forming means. An upper portion of the image reading section 4 is openable and closable with respect to a document table incorporated in the reading section 4, which will be explained later. Further, a document automatic feeder 8 is set in the image reading section 4 for feeding objects to be read, i.e. documents D, to the document table one by one, and for pressing each document D against the document table.

On an upper portion of the image reading section 4, a document table 11 of transparent glass is provided for placing the document D thereon, and a document scale 12 is provided on one end of the table 11 for indicating a position on the table 11 in which the document D is to be set. The table 11 is opposed to the document automatic feeder 8 when the feeder 8 is in the closed state.

In the vicinity of an outer cover (not shown) located around the document table 11, there is provided a control panel (which is only schematically shown in FIG. 1) for instructing the start of copy operation of the copy machine 2, inputting numerical data such as the number of copies, copy magnification, etc., and inputting a control signal for selecting a sheet size.

The image reading section 4 also includes, under the document table 11, an exposure lamp 13 for illuminating the document D placed on the document table 11, an auxiliary reflection plate 14 for converging light from the exposure lamp 13 onto the document D, a first mirror 15 for reflecting light reflected from the document D (to the left in FIG. 2), etc. The exposure lamp 13, the auxiliary reflection plate 14 and the first mirror 15 are fixed to a first carriage 16, and are adapted to move parallel to the document table 11 together with the first carriage 16. The first carriage 16 is moved parallel to the document table 11 by means of a pulse motor (not shown) connected thereto via a toothed belt (not shown), etc.

A second carriage 20 is provided at the left side of the document table 11 in a direction in which light reflected from the first mirror 15 is guided.

The second carriage 20 is provided with a second mirror 21 for downwardly reflecting light reflected from the document D and guided through the first mirror 15, and a third mirror 22 located at right angles to the second mirror 21 for reflecting the light to the right in FIG. 2. The second carriage 20 is moved in accordance with the movement of the first carriage 16 by means of the toothed belt (not shown), etc. which drives the first carriage 16. The second carriage 20 is moved parallel to the document table 11 at ½ the speed of the first carriage 16.

Under the first carriage 16 and in a plane which includes the optical axis of light reflected from the second carriage 20, there are provided a converging lens 23 for converging the light reflected from the second carriage 20 with a predetermined magnification, and a CCD image sensor 24 for converting the light converged by the converging lens 23 to an electric signal, i.e. image data.

The image forming section 6 has a photosensitive drum 30 rotatably serving as an image carrier and located at substantially the center of the copy machine 2. The photosensitive drum 30 is rotated at a predetermined speed by a motor (not shown).

Around the photosensitive drum 30, the following elements are provided in the order mentioned: a charger 31 for charging the surface of the drum with a predetermined amount of electricity; a laser exposure unit 32 (which will be described later in more detail with reference to FIG. 3) including a semiconductor laser element, a polygon mirror or polarization unit, fθ lenses, reflection mirrors, a horizontal synchronization detector, etc., and adapted to emitting a laser beam to a surface portion of the photosensitive drum 30 along the axis of the same to thereby form an electrostatic latent image on the surface portion; a developing unit 33 having a developing roller 33a for applying toner as a developer to the electrostatic latent image formed on the photosensitive drum 30 by exposure using the laser exposure unit 32, thereby developing an image with a desired image density; a transfer/separation charger 34 for transferring a toner image formed on the photosensitive drum 30 to a paper sheet P fed from a sheet cassette (which will be described later), and separating the paper sheet P with the toner image from the drum 30; a peeling claw 35 for peeling the paper sheet P from the surface of the drum 30; a cleaning unit 36 for cleaning toner remaining on the drum 30; and a deelectrifier unit 37 for deelectrifying the potential remaining on the drum 30.

A multi-stage sheet feeder 40 as sheet feeder means is formed integral with the copy machine 2 and located at the bottom of the machine 2 under the photosensitive drum 30. The sheet feeder 40 has a plurality of cassettes, which are arranged in the vertical direction and can be detached from the copy machine 2 through a front portion thereof.

Specifically, the multi-stage sheet feeder 40 has an upper cassette 41, a middle cassette 42 and a lower cassette 43 for containing copy sheets P of different sizes. For example, these cassettes 41, 42 and 43 contain, in the longitudinal direction, A4-size copy sheets, B4-size copy sheets and A3-size copy sheets, respectively. Each cassette can contain about five hundred sheets at maximum.

The upper, middle and lower cassettes 41, 42 and 43 respectively have pickup rollers 44a, 44b and 44c provided at respective predetermined locations for picking up sheets one by one. Transfer rollers 45a, 45b and 45c and separation rollers 46a, 46b and 46c formed integral with the transfer rollers 45a, 45b and 45c, respectively, are arranged for separating the copy sheets P from one another at locations at which tip portions of the copy sheets P picked from the cassettes 41, 42 and 43 by the pickup rollers 44a, 44b and 44c, respectively, pass.

The separation rollers 46a, 46b and 46c have their axes arranged parallel to the transfer rollers 45a, 45b and 45c, respectively, and contact them with a predetermined press force, respectively. Further, the separation rollers are adapted to rotate in a direction opposite to the rotational direction of the transfer rollers, so that only the uppermost one of the copy sheets P picked from each cassette can be fed to a transfer passage, which will be described later.

A large capacity feeder 47 for containing most-frequently-used copy sheets, for example, A4-size sheets is provided at a right portion of the multistage sheet feeder 40. The feeder 47 can contain about 3000 sheets at maximum. The feeder 47 has a pickup roller 48 provided at a predetermined location thereof for picking up sheets one by one. A separation mechanism 49 which includes a transfer roller 49a and a separation roller 49b vertically arranged is provided between the pickup roller 48 and the photosensitive drum 30. In the separation mechanism 49, the separation roller 49b is adapted to rotate in a direction opposite to the rotational direction of the transfer roller 49a, so that only the uppermost one of the copy sheets P picked from the large capacity feeder 47 by the pickup roller 48 can be fed to the transfer passage, which will be described later.

A manual feeder 50 capable of feeding copy sheets P is provided above the large capacity feeder 47, independent of the cassettes 41, 42 and 43 and the feeder 47.

Between the manual feeder 50 and the photosensitive drum 30, there are provided a pickup roller 51 for picking up a paper sheet P inserted in the manual feeder 50, a manual guide 52 for guiding the paper sheet P picked by the pickup roller 51, and a transfer roller 53 for transferring the paper sheet P guided by the manual guide 52 to the photosensitive drum 30.

A transfer passage 54 is provided between the photosensitive drum 30 and each of the cassettes 41, 42, 43 and the large capacity feeder 47, for guiding the paper sheet P therebetween. The transfer passage 54 passes through a transfer region defined between the photosensitive drum 30 and the transfer/separation charger 34, and reaches the outside of the copy machine 2. A plurality of transfer rollers 55 are provided across the transfer passage 54 for transferring to the photosensitive drum 30 the copy sheets P fed from each cassette, the large capacity feeder 47 and the manual guide.

Across that portion of the transfer passage 54 which is located in the vicinity and upstream of the photosensitive drum 30, there is provided an aligning roller 56 for correcting the inclination of a paper sheet P guided through the transfer passage 54, aligning the front end of a toner image on the photosensitive drum 30 with the front end of the paper sheet P, and feeding the paper sheet P to the transfer region at the same movement speed as that of the outer peripheral surface of the drum 30. An aligning sensor 56a is provided slightly upstream of the aligning roller 56 for detecting whether the paper sheet P has reached the aligning roller 56.

A transfer belt 57 is provided for further transferring the paper sheet P having passed the transfer region. A fuser unit 58 which includes a pair of heat rollers having their surfaces put in press contact with each other is provided across that portion of the transfer belt 57 at which the photosensitive drum 30 is not easily influenced by the heat of the fuser unit. The fuser unit 58 heats the paper sheet P with a toner image so as to fuse the toner image and fix the toner image on the sheet by pressing the toner image and the sheet.

A discharge tray 59 is attached to that side portion of the copy machine 2 which is opposed to the fuser unit 58, for discharging the paper sheet P with the toner image fixed thereon by the fuser unit 58.

A discharge switch unit 60 is provided between the fuser unit 58 and the discharge tray 59 for guiding the paper sheet P with the toner image fixed thereon to one of the discharge tray 59 and a sheet reversing unit described later.

The discharge switch unit 60 has first and second discharge rollers 61 and 62 for forwarding the paper sheet P having passed the fuser unit 58, and a distribution gate 63 located between the first and second discharge rollers 61 and 62 for selectively distributing the paper sheet P having passed the fuser unit 58 to one of the discharge tray 59 and the sheet reversing unit.

A reversing mechanism 64 includes a temporarily collecting section 65 for temporarily collecting the paper sheet P having passed the transfer region and the fuser unit 58, a reversing passage 66 for reversing the paper sheet P having passed the fuser unit 58 and guiding it to the temporarily collecting section 65, a pickup roller 67 for picking up, one by one, the copy sheets temporarily collected in the temporarily collecting section 65, a reverse transfer passage 68 for again guiding the paper sheet P received in the temporarily collecting section 65 to the aligning roller 56, and a feed roller 69 for feeding the sheet P guided to the reverse transfer passage 68 toward the aligning roller 56.

The document automatic feeder 8 has a cover 71 formed of a rear edge portion thereof attached to an upper surface rear edge portion of the copy machine 2 by means of a hinge device (not shown). As described above, the cover 71 can be opened and closed with respect to the document table 11 of the image reading section 4 by angularly displacing the overall document automatic feeder 8.

A document feed table 72 for holding a plurality of documents is provided at a middle portion of the upper surface of the cover 71. A pickup roller 73 is provided at an end of the document automatic feeder 8 close to the document feed table 72, for successively picking documents D set on the document feed table 72 and feeding the documents D from the table to one side of the document table 11 of the image reading section 4.

An empty sensor as a document sensor for sensing whether or not the document D is set on the document feed table 72 is provided at a predetermined location of the table 72. A document sub-sensor (not shown) which functions like a document position sensor 17 for sensing the position on the document table 11 in which the document D is set may be provided on the document feed table 72.

A sheet feed roller 74 for feeding the document D picked by the pickup roller 73 to the document table 11, and an aligning roller 75 for aligning the front end of the document D fed from the sheet feed roller 74 are provided in a direction in which the pickup roller 73 picks the document.

An aligning sensor 75a is provided between the aligning roller 75 and the sheet feed roller 74 for sensing whether the document D has reached the aligning roller 75.

A transfer belt 76 as large as covers substantially the overall document table 11 is provided and is adapted to transfer the document D fed from the document feed table 72 to a predetermined portion of the document table 11 via the pickup roller 73, the sheet feed roller 74 and the aligning roller 75 is provided within the cover 71 such that it is opposed to the document table 11 of the image reading section 4 in a state where the document automatic feeder 8 is closed. The transfer belt 76 bridges a pair of belt rollers 77 located at opposite end portions of the cover 71, respectively, and is rotatable bidirectionally by means of a belt driving mechanism (not shown).

In a right side portion of the document automatic feeder 8, there are provided a reversing roller 78 for feeding, toward the outside, the document D transferred from the left to the right in FIG. 2 by the transfer belt 76, a pinch roller 79 for pressing the document D against the reversing roller 78, a flapper for returning to the transfer belt 76 or discharging to a predetermined discharge portion of the cover 71 the document D transferred by the reversing roller 78 and the pinch roller 79, a discharge roller 81 for discharging the document D transferred by the reversing roller 78 when the flapper 80 is switched to the discharge side, and a jam sensor 82 for sensing whether the document is in a jam state in the vicinity of the reversing roller 78.

FIG. 1 is a schematic block diagram, showing a control mechanism employed in the electronic photograph type digital copy machine 2 shown in FIG. 2.

The electronic photograph type digital copy machine 2 mainly includes a control panel section 110, a scanner section 120, a printer section 130, a memory editing section 140, a system section 150 and a main control section 160.

The control panel section 110 includes a control panel 101 for instructing the start of the copy operation of the copy machine 2, inputting numerical data such as the number of copies, copy magnification, etc., and inputting a control signal for selecting a sheet size; a control panel CPU 111 for detecting inputs by various switches, a touch panel, etc. (which are not shown), and displaying data on the touch panel, and turning on/off an LED (not shown); a read only memory (hereinafter referred to as a "ROM") 112; and a random access memory (hereinafter referred to as a "RAM"). Thus, the control panel section 110 is used by the user to input various control data.

The control panel CPU 111 detects inputs by the input keys of the control panel 101 or by the touch panel, and controls the display of the touch panel or the turn on/off of the LED, etc., on the basis of data stored in the ROM 112 and the RAM 113.

The scanner section 120 includes a scanner CPU 121, and a ROM 122 and a RAM 123 connected to the scanner CPU 121. The scanner section 120 fetches an image of the document D as data indicative of an intensity distribution of light by operating the CCD image sensor 24 of the image reading section 4 under the control of the scanner CPU 121 based on control data stored in the ROM 122 and the RAM 123. Further, the scanner section 120 outputs a predetermined driving signal to a mechanism control section 124 for driving a pulse motor (not shown) to move each of the first and second carriages 16 and 20 at a predetermined speed. The scanner CPU 121 is supplied with a reference clock CK which is to be input to a main CPU 161 incorporated in the main control section 160 (which will be described later). The scanner CPU 121 is also supplied with a divider clock CKS output from a frequency divider 168 connected to the main CPU 161. The divider clock CKS is obtained by multiplying a predetermined number of clocks by a positive constant (which includes a fraction).

The scanner section 120 also includes an A/D converter circuit 125 for converting, to a digital signal by known A/D conversion, analog image data output from the CCD image sensor 24 by photoelectric conversion; a shading correction circuit 126 for removing an error contained in the output of the CCD image sensor 24 from the digital signal obtained by the A/D converter circuit 125, and removing the influence of ununiformity of luminous energy from the illumination lamp 13; and a line memory 127 for supplying, at a predetermined point of time, the memory editing section 140 with image data of the document D read by the CCD image sensor 24. Under the control of the scanner CPU 121 based on data stored in the ROM 122 and the RAM 123, the scanner section 120 converts the image data of the document D read by the CCD image sensor 24 to an electric signal, then binarizes the signal using a predetermined threshold value, and outputs the binarized signal to a page memory (which will be described later) incorporated in the memory editing section 140.

The scanner CPU 121 is also connected to the document automatic feeder 8. The feeder 8 feeds the document D under the control of the scanner CPU 121, which is controlled by the main control section 160 described later. The scanner CPU 121 is further connected to an editor 128. When edition data is input from a coordinate input device (not shown), the editor 128 outputs predetermined control data to the page memory of the memory editing section 140, and controls the size of a memory area for storing image data used for image forming.

The printer section 130 includes a printer CPU 131, and a ROM 132 and a RAM 133 which are connected to the printer CPU 131. The printer section 130 forms an image on the sheet P on the basis of image data read by the image reading section 4, i.e. the scanner section 120, and image data supplied from an external device, which will be described later.

The printer CPU 131 is connected to the following devices: a motor control mechanism 134 for controlling motors (not shown), which rotate the photosensitive drum 30, the developing roller 33a of the developer unit 33, the aligning rollers, the transfer belt, the fuser unit, the reversing mechanism, and the pickup rollers, the transfer rollers and the separation rollers of the cassettes 41–43 and the large capacity feeder 47; an input circuit 135 for receiving signals output from switches and sensors, such as the document position sensor 17 for sensing the position of the document D set on the document table 11, paper empty switches (not shown) respectively provided at the cassettes 41–43 and the large capacity feeder 47, a lever switch (not shown) provided at a predetermined location in each of the transfer passage 54 and the reversing mechanism 64 for detecting a jam state of the paper sheet P, the aligning sensor 56a, etc.; and a mechanism control section 136 for exciting solenoids included, for example, in the distribution gate 63 of the discharge switch unit 60 and the cleaning unit 35.

The printer CPU 131 is further connected to the following devices: a temperature control circuit 137 for controlling the temperature of the fuser unit 58; a voltage supply circuit 138 for applying a predetermined voltage to the developing unit, the transfer/separation charger, etc.; and a laser driving circuit 139 for varying the intensity of light emitted from a laser diode (not shown) employed in the laser exposure unit 32 in accordance with image data supplied from a page memory described later. Thus, an image is formed on the sheet P under the control of the printer CPU 131 based on data stored in the ROM 132 and the RAM 133.

The memory editing section 140 includes a memory control CPU 141, which is responsive to instructions supplied from both a main CPU (which will be described later) employed in the main control section 160 and a system CPU (which will be described later) employed in the system section 150, for converting image data supplied from the scanner section 120 or an external device, to bit map data to be used to vary the intensity of light emitted from the laser diode of the laser exposure unit 32, and then temporarily storing the converted data in the page memory described later.

The memory control CPU 141 is connected to the following devices: an image editing section 142 for editing image data supplied from an external device via the system section 150, and image data on the document D read via the scanner section 120 and converted to a predetermined format by image processing (which will be described later) in the main control section 160; a compression/expansion section 143 for compressing or expanding input image data; an enlargement/contraction/rotation section 144 for enlarging, contracting and rotating input image data; a page memory 145 for storing, in units of one page, image data obtained from the image editing section 142, the compression/expansion section 143 and the enlargement/contraction/rotation section 144; an address control section 146 for managing memory addresses; to a memory management control section 147 for managing data stored in the memories; and an interruption control section 148 for imparting instructions for subjecting image data input in the image editing section 142 to compression/expansion and enlargement/contraction/rotation.

The system section 150 includes a system CPU 151 for controlling the input of image data supplied from a section other than the scanner section 120. The system CPU 151 controls external devices such as a facsimile device 152, a hard disk device 153, and a LAN 154 connected to a computer, a word processor, etc., and also controls a printer controller 155 for converting image data (code data) supplied via the facsimile device 152, the hard disk device 153 and the LAN 154, to image data which can be processed by the copy machine 2, thereby inputting image data to the image editing section 12 of the memory editing section 140.

The main control section 160 includes a main CPU 161 for controlling the CPUs 121, 131, 141 and 151 of the control panel section 110, the scanner section 120, the printer section 130, the memory editing section 140 and the system section 150, respectively. The control section 160 controls the transmission of signals among the control panel section 110, the scanner section 120, the printer section 130, the memory editing section 140 and the system section 150.

The main CPU 161 is connected to a ROM 162 which stores initial data for operating the copy machine 2, and also to a RAM 163 which stores various data input from the control panel section 110, the scanner section 120, the printer section 130, the memory editing section 140 and the system section 150 under the control of the CPUs 121, 131, 141 and 151. Further, the main CPU 161 is supplied with a reference clock CK output from a clock generation section, which is not described in detail. The main CPU 161 is further connected to a frequency divider 168 of a known structure for generating a predetermined clock on the basis of the reference clock CK.

The main CPU 161 is yet further connected to the following devices: a printer font ROM 164 for holding a printer font to be used to store code data input via the system section 150, in the page memory 145 of the memory editing section 140; a display font ROM 165 which stores a display font used for causing an editing display unit (not shown) to display an image corresponding to the code data input via the system section 150, and also for causing a liquid display/input panel (not shown) employed in the control panel to display a predetermined image; a data-switching/buffer memory 166 used to designate the destination of image data read by the scanner section 120, or to supply image data to the printer section 130, and functioning as a buffer memory to store image data transmitted between the line memory 127 of the scanner section 120 and the page memory 145 of the memory editing section 140 and between the page memory 145 and the laser exposure unit 32; and an image processing section 167 for masking or trimming input image data.

Figure 3:
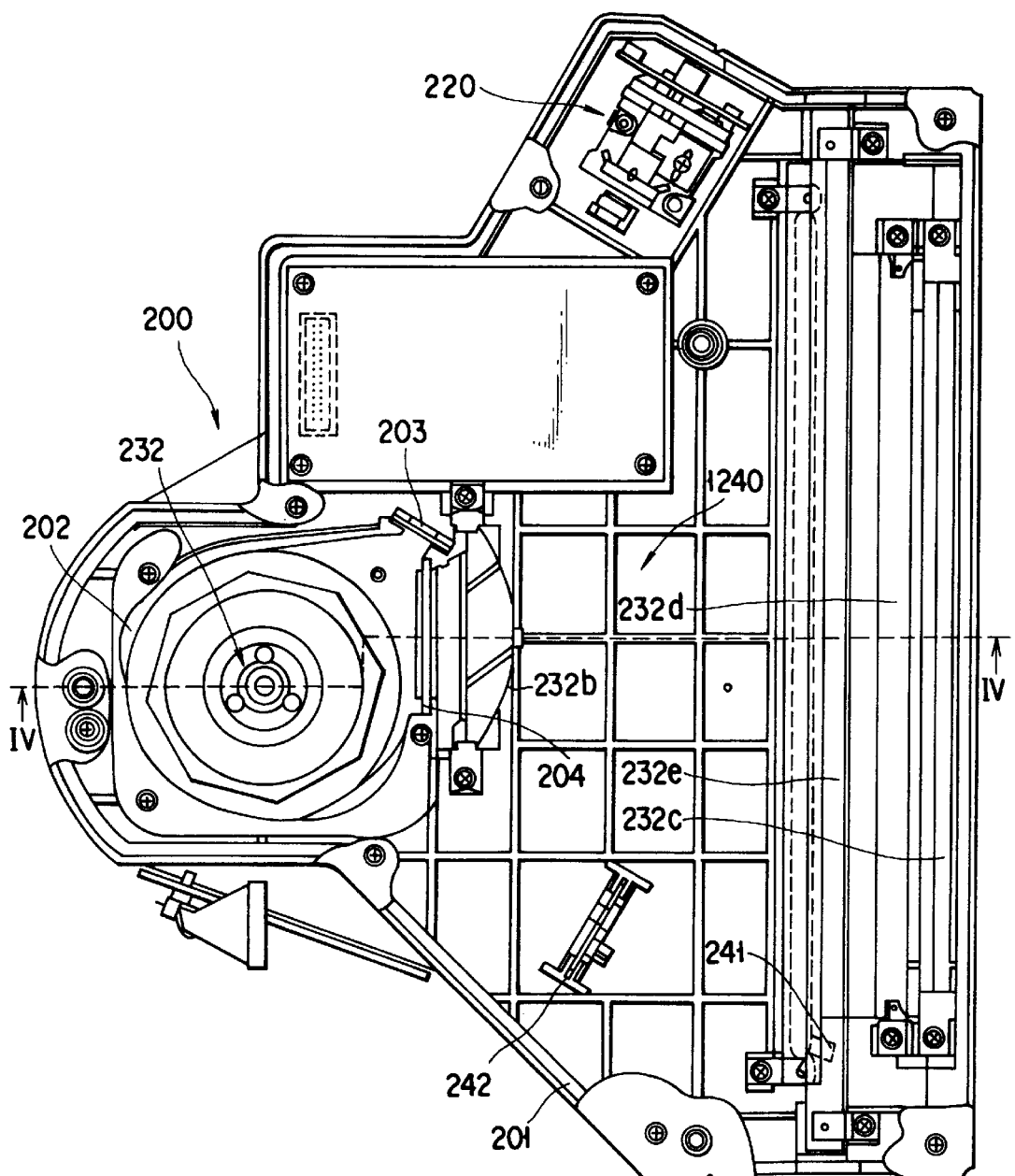
FIG. 3 is a schematic plan view, showing an example of a laser beam exposure device incorporated in the apparatus of FIG. 2.

FIGS. 3 and 4 are schematic views of the laser exposure unit incorporated in the copy machine shown in FIGS. 1 and 2.

As is shown in FIGS. 3 and 4, an optical scanner 200 includes a housing 201; a light emission unit 220 as an optical source fixed within the housing at a predetermined location for generating a laser beam; a light deflection unit 230 for linearly and continuously deflecting the laser beam from the light emission unit 220 to the photosensitive drum 30 of the copy machine shown in FIG. 2; and an image-forming optical section 240 for converging the deflected laser beam to the photosensitive drum 30 under predetermined image-forming conditions.

A partition wall 202 is provided in the housing 201 in the vicinity of the fixed light deflection unit 230 in order to prevent the noise of rotation of the deflection unit 230 from leaking to the outside. Further, soundproof glass plates 203 and 204 for permitting a laser beam to pass therethrough are provided in a position in which a laser beam directed from the light emission unit 220 to the light deflection unit 230 intersects the partition wall 202, and in a position in which a laser beam directed from the unit 230 to the section 240 unit 220 intersects the partition wall 202, respectively.

A dustproof glass plate 205 for preventing toner or paper dust from entering the optical scanner 200 is provided in a position in which a laser beam reflected from an emission mirror (which will be described later) goes out of the housing 201.

The light emission unit 220 incorporated in the optical scanner 200 has a laser element (not shown) for generating a laser beam, a first lens (not shown) for converting the laser beam emitted from the laser element to a converged beam or a parallel beam, a second lens (not shown) for shaping the cross section of the laser beam having passed the first lens to a predetermined configuration, and a restriction (not shown) for reducing the intensity of the laser beam emitted from the laser element.

The light deflection unit 230 is constituted by a polygon mirror 232a having a plurality of planar mirrors or reflection surfaces (eight reflection surfaces in this case), which are fixed to a rotor 231b formed integral with the rotary shaft 231a of a polygon motor 231 and can rotate at a high speed. The rotary shaft 231a has a magnetic fluid bearing (not shown). The reflection surfaces constitute the outer periphery of the polygon mirror 232a and equally divide the outer periphery.

A first fθ lens 232b, a return mirror 232c, a second fθ lens 232d and an emission mirror 232e are arranged in this order between the light deflection unit 230 and the photosensitive drum 30, i.e. in a direction in which a laser beam continuously reflected from the reflection surfaces of the polygon mirror 232a is emitted through the dustproof glass plate 204.

The first fθ lens 232b is employed to cause the rotational angle of each reflection surface to be proportional to a distance to a position in which the laser beam continuously deflected from the reflection surface in accordance with the rotation thereof is formed. Specifically, concerning a main scanning direction, a focal distance f which satisfies h=fθ is imparted in order to cause an angle θ formed between an optical axis O2 and a laser beam reflected from each reflection surface (i.e. θ is the deflection angle of the laser beam with respect to the optical axis O2), to be proportional to a distance h between that portion of the drum 30 which the laser beam reaches and the optical axis O2. The optical axis O2 is defined between the reflection point of each reflection surface and the center of the main scanning line perpendicular to the axis of the drum 30.

The return mirror 232c is a planar mirror which extends in the main scanning direction, and is used to guide a laser beam having passed the first fθ lens 232b toward the photosensitive drum 30. By virtue of this mirror, the optical scanner 200 can be made small in size.

The second fθ lens 232d cooperates the first fθ lens 232b to satisfy the aforementioned equation h=fθ concerning the main scanning direction, and also to correct an image forming characteristic such as distortion aberration or image curvature on the drum 30 concerning a laser beam returned by the return mirror 232c. Further, the second fθ lens 232d cooperates the first fθ lens 232b to correct variations in position in which the laser beam is converged, due to inclination of each reflection surface of the polygon mirror 232a.

The emission mirror 232e is a planar mirror which extends in the main scanning direction, and used to further deflect the laser beam having passed the second fθ lens 232d toward the photosensitive drum 30. The optical scanner 200 can be made small in size by virtue of the mirror 232e.

The optical scanner 200 also has a horizontal synchronization signal detecting section for detecting a horizontal synchronization signal indicative of the main scanning directional movement of the laser beam emitted from the emission unit 220.

The horizontal synchronization signal detecting section has a detection mirror 241 for horizontal synchronization detection and a photodetector 242 for detecting the horizontal synchronization signal.

The detection mirror 241 is situated in the housing 201 at a location at which that part of a laser beam which has passed an edge portion of the second fθ lens 232d and guided to a region outside the image region in the main scanning direction is reflected. The photodetector 242 for detecting the synchronization signal is situated in the housing 201 at a location at which it can securely detect a laser beam reflected from the detection mirror 241.

In the optical scanner 200, the laser beam emitted from the light emission unit 220 is guided along the optical axis O1 to the light deflection unit 230, as is shown in FIG. 5. In accordance with the rotation of the polygon mirror 232a of the light deflection unit 230, the laser beam is reflected to a region within a range of a predetermined deflection angle from the above-described optical axis O2 in the main scanning direction. The reflection beam passes the first fθ lens 232b and is upwardly reflected from the return mirror 232c. Then, the reflection beam passes the second fθ lens 232d with the inclination correcting function, and is reflected by the emission mirror 232e and converged on the photosensitive drum 30 via the dustproof glass plate 205.

More specifically, the laser beam directed by the polygon mirror 232a of the light deflection unit 230 to a region outside the image region in the main scanning direction, i.e. deflected with a maximum deflection angle relative to the optical axis O2, passes an edge portion of the first fθ lens (which is not shown in FIG. 5), and is reflected by the return mirror 232c upwardly and to the outside of the plane of scanning in the main scanning direction.

The laser beam reflected from the return mirror 232c passes an edge portion of the second fθ lens (which is not shown in FIG. 5, too), and is reflected by the emission mirror 232e downwardly and to a more outside region in the main scanning direction.

The laser beam reflected by the emission mirror 232e is guided to the horizontal synchronization signal detection mirror 241, where it is reflected to the photodetector 242 for horizontal synchronization signal detection. At this time, the laser beam directed to the photodetector 242 passes a plane which includes both the optical axes O1 and O2.

The copy operation of the copy machine shown in FIGS. 1–5 will now be described.

When a main switch (not shown) is turned on, the copy machine 2 is warmed up and initialized in accordance with a control program stored in the ROM 162. At the same time, responding to an instruction output from the scanner CPU 121 of the scanner section 120 under the control of the main CPU 161, the document automatic feeder 8 is initialized in accordance with a control program stored in an ADFROM (not shown) incorporated in the feeder 8.

When documents D to be copied are set on the document tray 72 of the automatic feeder 8, and a print key on the control panel (which are not shown) is turned on, an ADFCPU incorporated in the automatic feeder 8 checks whether or not the empty sensor (not shown) incorporated in the automatic feeder 8 is in the on-state.

If it is determined from the empty sensor that documents D are set on the document tray 72, a driving current is supplied from a motor driving circuit (not shown) to a sheet feed motor (not shown), thereby driving the pickup roller 73 and guiding to the sheet feed roller 74 a lowermost one of the documents D set on the document tray 72.

The document D guided to the sheet feed roller 74 is further guided to the aligning roller 75.

When the front end of the document D passes the aligning sensor 75a, a clutch (not shown) is turned on by an ADF mechanism control section (not shown) to stop the aligning roller 75. As a result, the document D taken out of the document tray 72 by the pickup roller 73 is temporarily stopped, whereby its inclination in the direction of transfer is corrected. Thereafter, the belt rollers 77 are rotated in a first direction (i.e. in the direction of transfer) to thereby rotate the transfer belt 76, and then the clutch is turned off at a predetermined point of time to thereby transfer the document D from the aligning roller 75 to the transfer belt 76.

Subsequently, the transfer belt 76 is rotated by the transfer motor for a predetermined period of time to transfer the document D to the document table 11 of the copy machine 2. The transfer belt 76 is stopped when a certain period of time (which is predetermined on the basis of the distance between the aligning sensor 75a and the document scale 12) has passed after the rear end of the document D passes the aligning sensor 75a. The inertial rotation of the transfer belt 76 is prevented by a brake (not shown).

When the front end of the document D is detected by the aligning sensor 75a, the ADFCPU (not shown) informs the scanner CPU 121 of the scanner section 120 of the copy machine 2 that the document D is transferred to a predetermined position. Subsequently, the main CPU 161 selects that one of the cassettes which contains copy sheets of an optimal size, on the basis of the size of the document D detected by the document automatic feeder 8 and the copy magnification set by means of the control panel (not shown).

In accordance with the input copy magnification, the start position in which pickup of image data by the CCD line sensor 24 into the line memory 127 should be started is read from the ROM 162 and stored in the RAM 163.

Thereafter, the illumination lamp 13 of the first carriage 16 is lighted up with a predetermined brightness, and the first carriage 16 is moved at a predetermined speed along the document D on the document table 11 by rotating the pulse motor (not shown). An image of the document D placed on the document table 11 is illuminated by the exposure lamp 13 and the reflection plate 14 on the first carriage 16. At this time, the document image is illuminated by light which is in the form of stripes, for example, with a width of 8–15 mm. The lamp 13 of the first carriage 16 is lighted at a location directly under the document scale 12 as shown in FIG. 2. More specifically, the location at which the lamp 13 is lighted is where shading correction can be performed using the light of the Lamp 13, which is reflected from a black reference section 12b and a white reference section 12w formed in the surface portions of the document scale 12 opposed to the lamp 13, when the amount of the light has been stabilized.

While being gradually diffused, light reflected from the document D is further reflected by the first mirror 15 of the first carriage 16, and the second mirror 21 and the third mirror 22 of the second carriage 20 in this order, and guided to the front-side principle point (not shown) of the converging lens 23.

From the front-side principle point of the lens 23, the light is guided along the optical axis thereof to the rear-side principle point (not shown) thereof, and then gradually converged to the reading surface of the CCD line sensor 24.

At the CCD line sensor 24, the converged light which indicates the image data of the document D is subjected to photoelectric conversion, and output therefrom under a predetermined rule.

The output signal of the CCD line sensor 24 is sequentially supplied to an A/D converter circuit 125 in the order beginning from a signal component indicative of that pixel of the CCD line sensor 24 which is located in a predetermined position (not shown) corresponding to a read start position stored in the RAM 163. The A/D converter circuit 125 binarizes the output signal of the sensor 24. The binarized signal has its threshold level corrected by the shading correction circuit 126, and then is output to the line memory 127.

The signal or image data input to the line memory 127 is transferred to the image processing section 167 via the data-switching/buffer memory 166. In the image processing section 167, the image data is subjected, for example, to predetermined correction and conversion such as character selection, outline correction, etc., and then output to the page memory 145. The image data input to the page memory 145 is converted to a laser driving signal (printing signal) by a parallel/serial conversion circuit (not shown), and then output to the laser exposure unit 32.

In synchronism with the reading of the image data of the document D by the scanner section 120, a motor (not shown) for the photosensitive drum 30 is supplied with a motor driving voltage from the motor driving circuit 134 under the control of the main CPU 161, thereby rotating the drum 30 at a desired speed.

While the photosensitive drum 30 is rotated, a predetermined potential is applied to the surface of the drum 30 from the charger unit 31 under the control of the power supply circuit 138. For example, the initial surface potential of the drum 30 is set to about −650 V.

Subsequently, the Laser exposure unit 32 emits to the photosensitive drum 30 a laser beam modulated in accordance with image data corresponding to the image of the document D, i.e. printing data stored in the page memory 145 and obtained by converting bit map data to serial data by a parallel-serial conversion circuit (not shown). As described above, the point of time at which a laser beam is emitted from the laser exposure unit 32, i.e. the start point of writing, is determined on the basis of the start point of writing stored in the RAM 163 and corresponding to the size of each paper sheet P. Specifically, the time point of emission is determined by adding to the horizontal synchronization signal (not shown) a delay equal to a predetermined number of main scanning directional clocks which corresponds to the size of each paper sheet P.

Thus, an electrostatic latent image corresponding to the printing signal or image data is formed on the photosensitive drum 30. The latent image is developed with toner supplied from the developing roller 33a of the developing unit 33 to which a developing bias voltage, for example, of −450 V is applied from the power supply circuit 138. The developed toner image is transferred to the paper sheet P by means of the transfer/separation charger 34 to which a predetermined transfer voltage is applied from the power supply circuit 138.

The toner image transferred to the paper sheet P is separated from the surface of the photosensitive drum 30 together with the paper sheet P by means of the separation claw 35 and a separation force output from the transfer/separation charger 34. The separated paper sheet P with the toner image is transferred by the transfer belt 57 to the fuser unit 58, where the toner image is fixed on the paper sheet P.

The paper sheet P with the toner image is discharged by the first and second discharge rollers 61 and 62 into the discharge tray 59 located outside the copy machine 2.

Even after transfer of the toner image to the paper sheet P, the photosensitive drum 30 is kept rotating, and toner remaining thereon is removed by the cleaning unit 36. Then, the drum 30 is deelectrified by the deelectrifying unit 37, and used for the next image forming.

On the other hand, when reading of the document D placed on the document table 11 has been finished, the scanner CPU 121 instructs the ADFCPU (not shown) to replace the document D with a new one, under the control of the main CPU 161. Then, the transfer motor is rotated by a driving current from the motor driving circuit (not shown) to rotate the transfer belt 76.

As a result, the document D presently set on the document table 11 is transferred to the reverse roller 78, and discharged by the flapper 80 and the discharge roller 81 into a document-receiving region formed at a predetermined portion of the cover 71.

Subsequently, the empty sensor (not shown) checks whether or not there is a further document D to be copied. If there is, the document feed operation is repeated. Thus, the next document D is set on the document table 11 and has its image data read, as in the case of the first document D.

The same image forming operation as described above is performed for all documents D set in the document tray 72 of the automatic document feeder 8.

As described above, the motors, a heater lamp, etc. incorporated in the copy machine 2 are usually supplied with a power lower than a rated power in a standby state and not in the copy operation state, to reduce noise or save power. For example, a cooling fan (not shown), the motor 231 of the light deflection unit 230 of the laser beam exposure unit 32, etc. are operated at approx. half the rated rotational speed. Since the motor 231 for rotating the polygon mirror 232a of the light deflection unit 230 is thus rotated at half the rated rotational speed in the standby state, even when the control panel 101 has instructed to start the copy operation, the image reading section 4, i.e. the scanner section 120 shown in FIG. 1, cannot read an image of a document set on the document table 11 until the rotational speed of the polygon mirror 232a of the laser beam exposure unit 32 shifts from its standby value to a predetermined value, i.e. the rated value.

Figure 6:
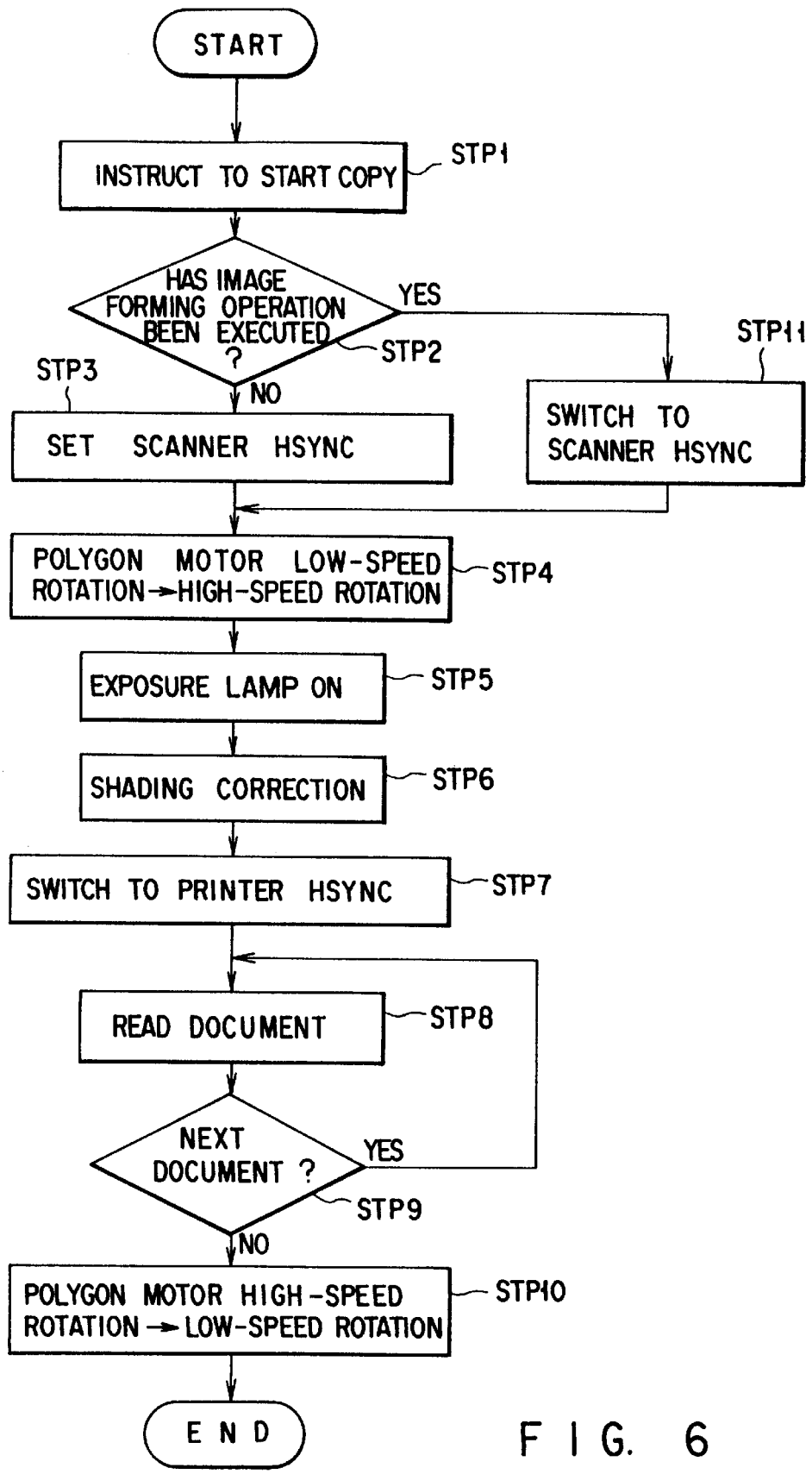
FIG. 6 is a flowchart, useful in explaining the operation of the invention.

As illustrated in FIG. 6, suppose a manner to reduce the time period of read standby required until the rotational speed of the polygon mirror 232a of the laser beam exposure unit 32 reaches the rated value, by extracting a horizontal synchronization signal from the scanner section 120 shown in FIG. 1 while the rotational speed of the polygon mirror 232a is set at a low value and until it reaches the rated value.

As described with reference to FIG. 1, the copy machine 2 mainly includes the control panel section 110, the scanner section 120 (the image reading section 4), the printer section 130 (the image forming section 6), the memory editing section 140 (the image forming section 6), the system section 150 and the main control section 160 (the image forming section 6).

When the print key (not shown) of the control panel section 110 is turned on to instruct the start of copy, the scanner CPU 121 of the scanner section 120 is supplied, via the printer CPU 131 and the main CPU 161, with a horizontal synchronization signal obtained by detecting, using the photodetector 242 of the horizontal synchronization signal detecting section 240, a laser beam deflected by the polygon mirror 232a of the light deflection unit 230 of the exposure unit 32 in the printer section 130. If image forming is performed at least one time, the horizontal synchronization signal used in the copy machine 2 is output with reference to the laser beam input to the photodetector 242. Accordingly, if an instruction to start copy is input in the standby state, the period of time required until the rotational speed of the polygon mirror 232a reaches the rated value is undesirably wasted.

Referring again to FIG. 6, a control method will be described for controlling the copy machine 2 when an instruction to start copy is input in the standby state of the machine 2, so as to make the image read section 4 (the scanner section 120) start reading of an image of a document until the rotational speed of the polygon mirror 232a reaches the rated value.

When the start of copy is instructed by a copy start key (not shown) on the control panel 101 of the copy machine 2 (step STP1), it is determined in a step STP2 whether or not copy operation is performed for the first time after the copy machine 2 is turned on, i.e. whether or not the start of copy operation is instructed at least using the print key after the machine 2 is turned on.

If in the step STP2, the start of copy operation is not instructed at least using the print key after the copy machine 2 is turned on, i.e. if the copy machine 2 is not controlled by the horizontal synchronization signal output from the photodetector 242 at the time of completion of the copy operation (STP2-No), immediately after the power switch (not shown) of the machine 2 is turned on or where the secondary circuit is reset by dissolving a paper jam state in the machine or supplementing toner, the horizontal synchronization signal is set using a scanner-side horizontal synchronization signal S-HSYNC output from the scanner CPU 121 of the scanner section 120. The scanner CPU 121 counts, using a main counter (not shown), the clocks CKS (each of which is obtained by dividing, using the divider 168, the frequency of the reference clock CK input to the main CPU 161 by a predetermined value), and outputs a pulse signal as the scanner-side horizontal synchronization signal S-HSYNC when the number of the counted clocks CKS reaches a predetermined value. The frequency of the signal S-HSYNC is set equal to that of a horizontal synchronization signal output from the printer section 130 (step STP3).

After step STP3 the rotational speed of the polygon motor 231 which rotates the polygon mirror 232a of the light deflection unit 230 is controlled by the motor driving circuit (not shown) so as to shift from a low value to a high value (i.e. the rated value) (step STP4).

Independent of the operation in the step STP3 and substantially parallel thereto, the illumination lamp 13 of the first carriage 16 is lighted up under the control of a lamp lighting circuit (not shown) (step STP5).

After a predetermined period of time required to stabilize the amount of light emitted from the illumination lamp 13 passes, the shading correction circuit 126 performs the following shading correction, i.e. calibrates the longitudinal sensitivity of the CCD line sensor 24 in accordance with the intensity distribution of light emitted from the lamp 13 and having passed the lens 23 (step STP6). Since as is generally known, the time period required to stabilize the amount of light emitted from the lamp 13 is shorter than the rising time period required to shift the rotational speed of the polygon motor 231 from the low value to the stabilized high value, the correction of the output level of the CCD line sensor 24, i.e. the shading correction, is Completed before the rotational speed of the polygon motor 231 is stabilized. For example, the time period required for the shading correction is about 0.2 second, which is shorter than the time period required to shift the rotational speed of the polygon motor 231 from the low value to the rated (high) value. In the next step STP7, the horizontal synchronization signal is switched to the printer-side HSYNC based on the rotation of the polygon motor 231, and reading of the document image can be started.

Thus, the rotational speed of the polygon motor 231 instructed to shift to the rated high speed in the step STP4 is stabilized, and the printer-side horizontal synchronization signal HSYNC is output. The source of the horizontal synchronization signal is switched from the scanner CPU to the photodetector 242 of the laser beam exposure unit 32. The time point of switching of the source of the horizontal synchronization signal, at which the rotational speed of the polygon motor 231 reaches the rated value, is determined on the basis of a predetermined time period preset depending upon the characteristics of the polygon motor 231. For example, where the bearing incorporated in the polygon motor 231 for holding the polygon mirror 232a is made of ceramic, the rotational speed of the motor 231 is 12,874 rpm in the standby state, and a time period of about 3.7 seconds is necessary until it reaches 25,748 rpm required for image forming. On the other hand, where the bearing which holds the polygon mirror 232a is made of steel, the rotational speed of the motor 231 is 15,000 rpm in the standby state, and a time period of about 3.5 seconds is necessary until it reaches 22,500 rpm required for image forming. (step STP7)

In the step STP7, the horizontal synchronization signal HSYNC is supplied on the basis of a laser beam detected by the photodetector 242 of the laser beam exposure unit 32, thereby starting the reading of the image data of a document placed on the document table 11. More specifically, the first carriage 16 is moved at a predetermined speed parallel to the document table 11. As a result, the document on the document table 11 is radiated with light which is in the form of stripes. Light reflected from the document is reflected by the first mirror 15, the second mirror 21 and the third mirror 22 in this order, and converged on the reading surface of the CCD line sensor 24 via the converging lens 23. Thus, the image data of the document converged on the CCD line sensor 24, i.e. the light reflected from the document, is subjected to photoelectric conversion in the sensor 24 and output under a predetermined rule (step STP8).

After the reading of the image data of the document in the step STP8 is completed, it is checked in a step STP9 whether or not another document remains, on the basis of whether the automatic document feeder 8 performs replacement of documents, or whether there is another instruction from the user to start copy of a new document (step STP9).

If a further document to be copied is detected in the step STP9, the program returns to the step STP8, where reading of image data is repeated (STP9-Yes).

On the other hand, if it is determined in the step STP9 that all documents have been copied (STP9-No), the photodetector 242 of the laser beam exposure unit 32 is kept to be used as the source of the horizontal synchronization signal, while the rotational speed of the polygon motor 231 is shifted from the rated value to the low value or the standby value, thereby shifting the copy machine to the standby state (step STP10).

If it is determined in the step STP2 that the copy machine 2 is in the standby state (i.e. the copy operation has been just performed), or that at least one copy operation is performed after the power switch of the copy machine 2 is turned on (STP2-Yes), the source of the horizontal synchronization signal is shifted from the photodetector 242 of the laser beam exposure unit 32 to the scanner CPU 121 of the scanner section 120, before shifting the rotational speed of the polygon motor 231 rotating the polygon mirror 232a of the light deflection unit 230, from the low value to the high value (step STP11).

Then, the rotational speed of the polygon motor 231 is shifted from the low value to the high or rated value, and the operations in the steps STP4–STP10 are repeated.

As described above, according to the control method for controlling the copy machine 2 illustrated in FIG. 6, when the rotational speed of the polygon motor 231 reaches the rated value as shown in FIG. 8, the image reading section 4 starts to read an image of a document. Accordingly, the time period required to complete to copy the image of the document after the copy start key is turned on, i.e. the first copy time period, can be reduced as compared with the conventional image read operation, as is evident from FIG. 7.

Referring to FIG. 9, shading correction illustrated in FIG. 6 will be described in detail.

In the flowchart of FIG. 6, shading correction is necessary in a step STP6 for the following known reasons:

a) The voltage output from the CCD line sensor 24 is influenced by an ununiform distribution of light intensity in the longitudinal direction of the CCD line sensor 24 (i.e. influenced by the known law of $\cos^4\theta$ in an image forming system using a lens), since the light source is a direct light source (the illumination lamp 13), and light reflected from the document is converged by the lens 23.

b) The CCD line sensor generally incorporates 5000–7500 elements in the longitudinal direction, depending upon the size of a document it can read and also upon the resolution of each of the elements, and may generate different outputs even when the elements are radiated with light of the same amount, since the elements have different output voltage characteristics.

In light of the above, to read an image by the CCD line sensor 24, it is necessary to correct the differences in output voltage among the elements, depending upon the locations of the elements (concerning the above item a)), and the differences in output voltage between each pair of adjacent elements (concerning the above item b)).

The shading correction circuit 126 uses, as reference correction values, the outputs of the CCD line sensor 24 obtained when illumination light beams from the illumination lamp 13 respectively correspond to a black reference section 12b and a white reference section 12w incorporated in the document scale 12. These reference values are stored in a memory (not shown), and used to correct the output of the CCD line sensor 24 obtained when an illumination light beam from the lamp 13 corresponds to a portion located directly below the document table 11, i.e. to the document D. A correction amount I to be corrected by shading correction is given by $$I = k \times (S-B)/(W-B)$$

where k represents a correction coefficient for correcting a photoelectric conversion characteristic peculiar to the CCD line sensor 24, S image data before correction, B black data obtained on the basis of light reflected from the black reference section 12b of the document scale 12, and W white data obtained on the basis of light reflected from the white reference section 12w of the document scale 12.

More specifically, in accordance with the exposure and movement of the illumination lamp 13, an image signal corresponding to the amount of light reflected from the document on the document table 11 is output from the CCD line sensor 24.

When the position of the illumination lamp 13 corresponds to a lower portion of the document scale 12, the black and white reference sections 12b and 12w are exposed, and the outputs of the CCD line sensor 24 at this time are stored in a memory (not shown) as reference values for shading correction.

When the illumination lamp 13 is moved to a position below the document set on the document table 11, the output of the CCD line sensor 24 is corrected into a read signal by shading correction on the basis of the reference values stored in the memory.

As described above, image data obtained by reading the actual document D can be expressed with the ratio of black color to white color by beforehand determining upper and lower reference values for the image data on the basis of light beams reflected from the black and white reference sections. As a result, a stable read signal and accordingly an excellent image can be obtained, irrespective of unevenness in light amount in the longitudinal direction of the illumination lamp 13, the accuracy of the lens 23, and the output error of each element of the CCD line sensor 24.

As described above, in the invention, a timing signal with the number of clocks substantially equal to that of the synchronization signal is generated to perform shading correction of the CCD line sensor, while the rotational speed of the polygon motor is shifted from a lower value assumed in the standby state to a rated value after the start of reading is instructed. The timing signal is created by counting clocks (which are obtained by dividing the frequency of a reference clock by a predetermined value), and resetting the count value substantially in synchronism with the output of the horizontal synchronization signal.

The above-described processing reduces the period of time required from when the start of reading is instructed to when the copy of an initial document is completed.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image forming apparatus for forming an image on an image forming medium, comprising:
   means for scanning a target area at a predetermined point of time to generate image data;
   means for emitting light of an intensity corresponding to image data generated by said scanning means;
   means for reflecting the light emitted from said emitting means toward an image carrier, the reflecting means having a plurality of reflecting sections;
   means for rotating a reflection section of said reflecting means so that the light from said emitting means exposes the image carrier;
   means for forming an image corresponding to an exposure image formed on the image carrier by exposure by the reflection section;
   means for outputting a synchronization signal to determine a point of time of emission by said emitting means at a time of the exposure, which is performed by the reflection section of said reflecting means rotated by said rotating means;
   means for generating a timing signal substantially identical to the synchronization signal used for the exposure by the reflection section of said reflecting means;
   means for driving said rotating means to rotate the reflection section of said reflecting means at a first speed at the time of the exposure by said reflecting means, and to rotate the reflection section of said reflecting means at a second speed lower than the first speed at a time of an operation other than the exposure; and
   means, responsive to an instruction to start a scan operation of said scanning means, for controlling the scanning means so that said scanning means scans the target area in synchronism with the timing signal from said generating means until a rotational speed of the reflection section shifts from the second speed to the first speed, and for controlling the scanning means so that said scanning means scans the target area in synchronism with the synchronization signal from said outputting means after said driving means has shifted the rotational speed of the reflection section to the first speed.

2. The image forming apparatus according to claim 1, wherein said generating means includes means for counting clocks obtained by dividing a reference clock by a first predetermined value, and second outputting means for outputting a pulse signal as said timing signal when a number of counted clocks reaches a second predetermined value.

3. The image forming apparatus according to claim 1, wherein said control means includes means for switching the synchronization signal to the timing signal when the rotational speed is the second speed.

4. The image forming apparatus according to claim 3, wherein the second speed is substantially a half of the first speed.

5. The image forming apparatus according to claim 1, wherein said emitting means includes a laser beam emission unit.

6. The image forming apparatus according to claim 1, wherein said control means includes means for switching the synchronization signal to the timing signal when said emitting means and said forming means have executed image forming processing.

7. The image forming apparatus according to claim 6, wherein said control means includes means for shifting the rotational speed from the second speed to the first speed when a start of image forming is instructed.

8. An image forming apparatus for forming an image on an image forming medium, comprising:
   means for illuminating an object to be read;
   means for converting light reflected from the object illuminated by said illuminating means to an electric signal that varies with an intensity of a dot with a predetermined size;
   means for radiating a laser beam on a basis of image data indicative of the object photoelectrically converted by said converting means;
   means, including a rotatable reflection sections, for reflecting the laser beam radiated from said radiating means;
   means for detecting part of the laser beam reflected from a reflection section of said reflecting means;
   means for generating a horizontal synchronization signal when said detecting means detects the laser beam reflected by the reflection section of said reflecting means;
   means for determining a point of time at which said converting means subjects the light reflected from the object to photoelectric conversion; and
   control means for causing said converting means to subject the light reflected from the object to photoelectric conversion at the time point determined by said determining means until a rotational speed of the reflection section of said reflecting means reaches a predetermined value and said generating means generates the horizontal synchronization signal.

9. The image forming apparatus according to claim 8, wherein said control means switches the horizontal synchronization signal to a timing signal when loud control means detects that said radiating means has executed image forming.

10. A method of forming an image of a document, which is employed in an image forming apparatus, the method comprising the steps of:
   illuminating an object to be read;
   scanning the object in a predetermined direction;
   converting light reflected from the illuminated; object to an electric signal that varies with an intensity of a dot with a predetermined size;
   radiating a laser beam on a basis of image data indicative of the object;
   reflecting by rotating a reflection section at a predetermined speed, the laser beam radiated with a laser beam intensity varied based on image data indicative of the object;
   detecting using a photodetector, in a predetermined position, the laser beam reflected from the reflection section;

generating a horizontal synchronization signal when said photodetector detects the laser beam reflected by the reflection section;

determining a point of time at which the light reflected from the object is subjected to photoelectric conversion and outputting a timing signal corresponding thereto; and subjecting the light reflected from the object to photoelectric conversion on a basis of the timing signal output until a rotational speed of the reflection section reaches a predetermined value and the horizontal synchronization signal is generated.

11. An image forming apparatus for forming an image on an image forming medium, comprising:

means for scanning a target area at a predetermined point of time to generate image data;

means for emitting light of an intensity corresponding to image data generated by said scanning means;

means for reflecting the light emitted from said emitting means toward an image carrier, the reflecting means having a plurality of reflecting sections;

means for rotating a reflection section of said reflecting means so that the light from said emitting means exposes the image carrier;

means for forming an image corresponding to an exposure image formed on the image carrier by exposure by the reflection section;

means for outputting a synchronization signal to determine a point of time of emission by said emitting means at a time of the exposure that is performed by the reflection section of said reflecting means rotated by said rotating means;

means for generating a timing signal substantially identical to the synchronization signal used for the exposure by the reflection section of said reflecting means;

means for driving said rotating means to rotate the reflection section of said reflecting means at a first speed at the time of the exposure by said reflecting means, and to rotate the reflection section of said reflecting means at a second speed lower than the first speed at a time of an operation other than the exposure;

means for detecting that a rotational speed of said rotating means has reached a predetermined value; and means, responsive to a detection result of said detecting means, for controlling said scanning means so that said scanning means scans the target area in synchronism with the timing signal from said generating means until the rotational speed of the reflection section shifts from the second speed to the first speed, and for controlling the scanning means such that said scanning means scans the target area in synchronism with the synchronization signal from said outputting means after said driving means has shifted the rotational speed of the reflection section to the first speed.

* * * * *